United States Patent
Fatulescu et al.

(10) Patent No.: US 11,273,379 B2
(45) Date of Patent: Mar. 15, 2022

(54) METHOD AND APPARATUS FOR PROVIDING A COMPUTER IMPLEMENTED GAME

(71) Applicant: KING.COM LIMITED, St. Julians (MT)

(72) Inventors: Ionut Puiu Fatulescu, Berlin (DE); Adrian Catalin Dumitrescu, sat Rosu (RO); Mihai Alin Dindareanu, Buchare (RO)

(73) Assignee: KING.COM LTD., St. Julians (MT)

( * ) Notice: Subject to any disclaimer, the term of this patent is extended or adjusted under 35 U.S.C. 154(b) by 122 days.

(21) Appl. No.: 16/558,223

(22) Filed: Sep. 2, 2019

(65) Prior Publication Data

US 2019/0381408 A1    Dec. 19, 2019

Related U.S. Application Data

(63) Continuation of application No. 15/019,359, filed on Feb. 9, 2016, now Pat. No. 10,398,980.

(60) Provisional application No. 62/113,674, filed on Feb. 9, 2015.

(51) Int. Cl.
*A63F 13/69*         (2014.01)
*A63F 13/537*        (2014.01)

(52) U.S. Cl.
CPC ............ *A63F 13/69* (2014.09); *A63F 13/537* (2014.09)

(58) Field of Classification Search
CPC ................................ A63F 13/69; A63F 13/537
See application file for complete search history.

(56) References Cited

U.S. PATENT DOCUMENTS

| | | |
|---|---|---|
| 2005/0250574 A1 | 11/2005 | Kane et al. |
| 2009/0124341 A1 | 5/2009 | Roach |
| 2009/0318217 A1 | 12/2009 | Acres |
| 2012/0270198 A1 | 10/2012 | Mika et al. |
| 2012/0315983 A1* | 12/2012 | Miller, IV ............... A63F 13/73 463/29 |

* cited by examiner

*Primary Examiner* — James S. McClellan
(74) *Attorney, Agent, or Firm* — Saul Ewing Arnstein & Lehr LLP

(57) ABSTRACT

A computer implemented game has unlockable game elements. When unlocked these unlockable game elements may provide extra moves or the like when playing a level. These game elements may be associated with a level. The game elements are unlocked by playing the game over a set of levels.

20 Claims, 10 Drawing Sheets

Figure 9

| ID | Name key | Power level | Ability | Start level | End level | No. of stars | Game modes |
|---|---|---|---|---|---|---|---|
| 730 | 732 | 734 | 736 | 738 | 740 | 742 | 744 |

METHOD AND APPARATUS FOR PROVIDING A COMPUTER IMPLEMENTED GAME

CROSS-REFERENCE TO RELATED APPLICATIONS

This application is a continuation of U.S. application Ser. No. 15/019,359, filed Feb. 9, 2016, which is based on, and claims priority to U.S. Provisional Application No. 62/113,674, filed Feb. 9, 2015, the entire contents of which are fully incorporated herein by reference.

FIELD OF THE INVENTION

Embodiments of this application relate a user device and a server for use in playing a computer implemented game.

Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object.

So-called "saga-games" are known where there are many different levels which a user can play. One technical challenge with such games is how to minimize the technical complexity of a game whilst at the same time providing a varied gaming experience for the user.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a method for providing a computer implemented game in a user device, the user device comprising at least one processor, a user interface and a display, the method comprising: receiving, by the at least one processor, from the user interface an input from a user selecting a level of a plurality of levels of the computer implemented game to play; and in response to selection of the level, providing by the at least one processor, an unlocked game element, the game element being one of a plurality of unlockable game elements which has been unlocked and which is suitable for use with at least one of a game feature and game mode associated with the level, the unlocked game element providing a function to assist the user when playing the level.

The method may comprise selecting, by the processor, the unlocked game element from a plurality of unlocked game elements, the selection being dependent on a criteria associated with the unlocked game elements.

The criteria may comprise at least one of: which game element has been most recently unlocked; which game element has been most recently upgraded; and which game element has the greatest effect on the level.

The method may comprise displaying, by the display, at least some of the unlockable game elements wherein the game elements which are at least one of unlocked and usable in the level are displayed in a visually distinct manner on the display.

The method may comprise receiving, by the at least one processor, user input from the user interface to select one of the unlockable game elements usable with the level to be used with the level, storing the user selected unlockable game element in memory, and in response to user input from the user interface causing the level to be replayed, providing the user selected unlockable game element as the unlocked game element.

The method may comprise determining, by the at least one processor, for at least one unlockable game element score information for a range of levels associated with the unlockable game element; comparing, by the at least one processor, the score information to respective unlocking and/or upgrading score information; and unlocking and/or upgrading, by the at least one processor, the game element if the score information exceeds the respective unlocking and/or upgrading score information.

The computer implemented game may comprise a plurality of levels, the plurality of levels being divided into a plurality of sets, at least one unlockable element being associated with a respective set.

The method may comprise at least one of unlocking and upgrading an unlockable game element, by the at least one processor, in response to a user achieving a given score in the levels of the set associated with the unlockable game element.

At least one unlockable game element may be provided with a plurality of power levels, each power level being unlocked in response to a user achieving a score in the levels of the set associated with a respective power level.

The method may comprise unlocking, by the at least one processor, an unlockable game element in a game level and using, by the at least one processor, the unlocked game element in another level.

The method may comprise using, by the at least one processor, the unlocked game element in one or more levels at least one of which: a user has previously played prior to the unlocking of the respective unlockable game element; and is subsequent to the level in which the game element has been unlocked.

According to another aspect, there is provided a computer device for providing a computer implemented game having: a user interface configured to detect user input; at least one processor configured to receive the detected user input from the user interface selecting a level of a plurality of levels of the computer implemented game to play and in response to selection of the level, providing an unlocked game element, the game element being one of a plurality of unlockable game elements which has been unlocked and which is suitable for use with at least one of a game feature and game mode associated with the level, the unlocked game element providing a function to assist the user when playing the level; and a graphics rendering component operable to render the game elements on a display.

The display may be provided by the user interface.

The at least one processor may be configured to select the unlocked game element from a plurality of unlocked game elements, the selection being dependent on a criteria associated with the unlocked game elements.

The criteria may comprise at least one of: which game element has been most recently unlocked; which game element has been most recently upgraded; and which game element has the greatest effect on the level.

The device may comprise a display which is configured to display at least some of the unlockable game elements, wherein the game elements which are at least one of unlocked and usable in the level are displayed in a visually distinct manner on the display.

The apparatus may comprise a memory and wherein the at least one processor may be configured to receive user input from the user interface to select one of the unlockable game elements usable with the level to be used with the level, store the user selected unlockable game element in the memory, and in response to user input from the user interface cause the level to be replayed, providing the user selected unlockable game element as the unlocked game element.

The at least one processor may be configured to determine for at least one unlockable game element score information for a range of levels associated with the unlockable game element; compare the score information to respective unlocking and/or upgrading score information; and unlock and/or upgrading the game element if the score information exceeds the respective unlocking and/or upgrading score information.

The computer implemented game may comprise a plurality of levels, the plurality of levels being divided into a plurality of sets, at least one unlockable element being associated with a respective set.

The at least one processor may be configured to at least one of unlock and upgrade an unlockable game element in response to a user achieving a given score in the levels of the set associated with the unlockable game element.

At least one unlockable game element may be provided with a plurality of power levels, each power level being unlocked in response to a user achieving a score in the levels of the set associated with a respective power level.

The at least one processor may be configured to unlock an unlockable game element in a game level and the unlocked game element in another level.

The at least one processor may be configured to use the unlocked game element in one or more levels at least one of which: a user has previously played prior to the unlocking of the respective unlockable game element; and is subsequent to the level in which the game element has been unlocked.

According to another aspect, there is provided a computer program product for providing a computer implemented game on a user device, the computer program product comprising code embodied on a computer-readable medium and being configured so as when executed on a processor of the computer device to: receive from a user interface an input from a user selecting a level of a plurality of levels of the computer implemented game to play; and in response to selection of the level, provide an unlocked game element, the game element being one of a plurality of unlockable game elements which has been unlocked and which is suitable for use with at least one of a game feature and game mode associated with the level, the unlocked game element providing a function to assist the user when playing the level.

According to an aspect, there is provided a method for providing a computer implemented game in a user device, the user device comprising at least one processor, a user interface and a display, the method comprising receiving from the user interface an input from a user selecting a level of a plurality of levels of the computer implemented game. Alternatively or additionally this may be in response to receiving information from a server. The information may comprise information about game progress associated with a user. Alternatively or additionally, the method may be prompted by any suitable user input or any suitable event occurring in the user device.

The method may comprise determining at least one of a game mode associated with the level and a game feature associated with the level and which of a plurality of unlockable game elements has been unlocked and which is suitable for use with at least one of the game feature and game mode.

It should be appreciated that not all levels will have a game mode and a game feature. One or more levels may only have a game mode and not a game feature or vice versa.

An unlocked game element may be suitable for a game mode or a game feature. An unlocked game element may be suitable for a particular game mode and a particular game feature.

The method may comprise displaying at least one of the determined game elements.

In some embodiments, the method comprise selecting which one or more of the determined game elements is to be displayed.

In some embodiments only one determined game element is displayed. In some embodiments, the most recently unlocked and/or upgraded game element is displayed.

In other embodiments, the game element which has the greatest effect on the level is selected.

In some embodiments, all of the unlocked game elements may be displayed. Those which can be used in the selected level may be displayed differently and/or have appropriate information so that they can be distinguished from those which cannot.

In some embodiments, unlocked game elements may be displayed differently and/or have appropriate information so that they can be distinguished from those which have not yet been unlocked.

According to an aspect, there is provided a method for providing a computer implemented game in a user device, the user device comprising at least one processor, a user interface and a display, the method comprises: determining for an unlockable game element score information for a range of levels associated with the lockable game element; comparing the score information to an unlocking and/or upgrading score information; and unlocking and/or upgrading the game element if the score information exceeds the respective unlocking and/or upgrading score information.

One or more of the following may be used in conjunction with one or other of the above aspects. In some embodiments, the computer implemented game comprises a plurality of levels, the plurality of levels being divided into a plurality of sets. Generally a set will comprises a plurality of consecutive levels.

To unlock an unlockable game element may require a user to achieve a given score over a set of levels. An unlockable game element may be associated with a particular set of levels such that the user has to achieve a given score over the set of levels.

An unlockable game element may be provided with a plurality of power levels. When an unlockable game element is unlocked the unlocked game element can be applied in another level to assist in achieving a game objective.

The unlocked game element can be used in one or more levels in one or more sets which a user has previously played.

The unlocked game element can be used in one or more levels in one or more sets which are subsequent to the set with which the unlocking of the game element is associated.

The unlocked game element may be used in one or more levels in the set with which the unlocking of the game element is associated.

According to some aspects, there is provided a user device, the user device may comprise at least one processor which is configured to cause one or more of the method steps to be performed in the user device. The user device may have a displayed configured to display game elements. The user device may have a user interface configured to receive user input from the user.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 9 shows a data structure for an unlockable game element;

DETAILED DESCRIPTION OF SOME EMBODIMENTS

One particular context is that of a computer game where a game board is displayed to a user which has adjacent selectable objects, for example in the form of letter tiles. In one game, the mechanic of the game is that a user should select a set of tiles in succession and thereby form words. The successful delivery of this game depends on the game application being able to generate letter tiles in a way that enables a user to form those words.

Another example is a 'match-3 game' where the player is required to find patterns on a seemingly chaotic board. The player then has to match three or more of the same type of game element on the game board and those matched elements will then disappear. In some games the user has to match more than 3 game elements.

Another example are the so called 'clicker' games where the player can click on a group of adjacent game elements of a certain type and those will then be removed. Some clicker games only require two adjacent objects to remove those elements if clicked by the user. Others may require more than two.

Another type of match games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

Thus while some embodiments are described in relation to a word game, it is clear that embodiments may be used with any other suitable type of games.

In some embodiments, the game may be provided with different levels. Each level may have a specific goal. Each level may have a specific difficulty associated with it. The harder a level, generally the less likely a level is to be completed and/or the greater the required skill of the player.

Figure 1:
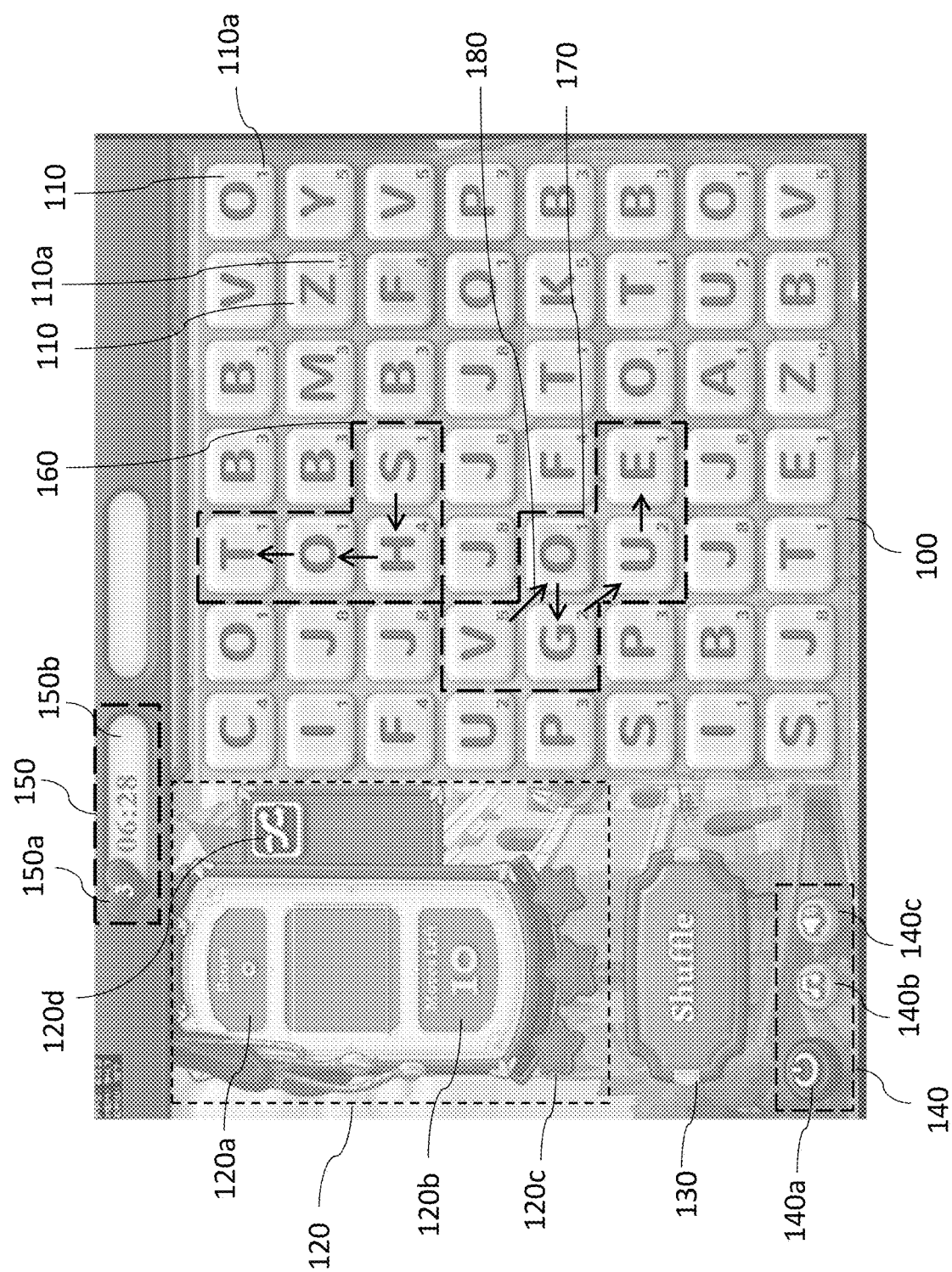
FIG. 1 shows an example embodiment of a game board.

FIG. 1 shows an example game board of a letter tile based computer implemented game according to an embodiment.

The game board 100 or playable area 100 is displayed upon which are disposed game objects or elements 110. The game objects 110 in this embodiment comprise letter tiles which may have varying characteristics. The characteristics may be one or more of color, shape, and/or different scores 110a per object or tile 110. In this embodiment, the objects 110 are square letter tiles arranged in a rectangular grid like fashion, although in other embodiments other game board configurations and other game object shapes or tiles may be utilized.

A game object may also comprise an "entity" rather than a tile. Whereas a tile may be considered a space on a game board grid, an entity may be considered something that occupies that space.

In some embodiments, "blockers" may be present which may act to block a user during gameplay. The blocker may be a blank tile which cannot be used to form a word, or some form of entity. Such blockers can therefore be used to make a level harder. A blocker may be a permanent fixture in a given level, or may be removable, for example by using adjacent tiles to form a word which tiles are then removed from the game board. An example of a blocker is a "rock-blocker". The blocker may switch position during gameplay or may be fixed in position Another type of special object is a "booster". A booster may operate to help increase a user's score, for example by increasing the number of tiles removed from the game board. One example of a booster is a "bomb" tile or entity. The bomb entity may comprise a bomb-shaped icon. The bomb icon may be activated by including it in a word or including adjacent tiles in a selected word. A parameter such as a game target, when reached, may also cause a bomb entity to be activated. When a bomb is activated it may "explode", causing a plurality of adjacent tiles to be removed from the game board, thus increasing the user's score. There may be different types of exploding entities. For example a "line blaster" is a type of booster whose explosion can be controlled to give extra points whilst destroying other letters on the table. A "flask bomb" on the other hand has a countdown timer and when it explodes it takes away a number of remaining moves (e.g. two moves), but does not remove any tiles from the board. Therefore the "flask bomb" may be considered a type of blocker.

In some embodiments, the game may be implemented so that a level or a game session is completed when a certain target is reached by the user.

The target may comprise achieving a certain score by selecting tiles 110 to make words, each word scoring a total score at least in part in dependence on each of the individual tile scores 110a selected.

The target may alternatively be to remove one or more specific tiles, make a certain number of words, make a given number (where the number is one or more) of words having a given length or the like, use a particular tile a given number of times (where the number is one or more) or the like. Another example of a game objective includes cheese icons which need to be collected in a "cheese-falls" game mode, the idea being to cause cheese icons to fall off the bottom of the game board by removing lower tiles. It will of course be understood that cheese icons are one example only of the type of icon that could be used in such a game.

The game can in some embodiments end if the player or user runs out of time 150b or runs out of moves 120b before managing to reach a designated target (not shown).

The game board 100 may have a number of game objects 110 having different characteristics 110a aligned in rows and columns, such as a 7×8 grid as shown in FIG. 1. Other grid sizes may be suitable. In such an embodiment the game objects on the game board have three, five or eight nearest or adjacent neighbouring game object tiles. Other game board layouts or configurations may be provided. For example, triangular, pyramidal, hexagonal, octagonal or other layouts comprising position spaces or tiles within the game board 100 may be provided for display.

The game board 100 may be accompanied by a region 120 indicating a current score 120a and a number of moves remaining 120b as shown in the Figure.

There may also be provided control or optional actionable items 130, 140, here shown as a shuffle control 130, and a game reset or off control 140a, music 140b and sound or volume control 140c.

The game board 100 may in some embodiments be accompanied by a region 150 indicating a timer or countdown 150b and a number of lives 150a remaining to the player.

The game board 100 shows region 160 in which a word may be formed. For example, region 160 indicates the word S-H-O-T being selected by individual selection of the game objects tiles 110, forming the word "shot" scoring a total of seven points. The forming of the word "shot" here involves only horizontal and vertical movement or selection via touch input.

Game board 100 of FIG. 1 also shows an example region 170 wherein the word "Vogue" is spelled. As can be seen, to create this word scoring 11 points, requires diagonal selection of neighbouring object tiles 100, as shown by arrow 180 indicated in the Figure.

When a word (e.g. "Shot", "Vogue" etc.) is spelled, then the letter tiles forming those words are automatically removed from the screen and letter tiles above the removed letters drop down. New letter tiles are provided to the screen from above to replenish the gaps now left by the tiles which have dropped down. New tiles are added to the game board in a manner that ensures that there are letter combinations on the game board that allow one or more words to be spelled by a user, in some embodiments.

Figure 2:
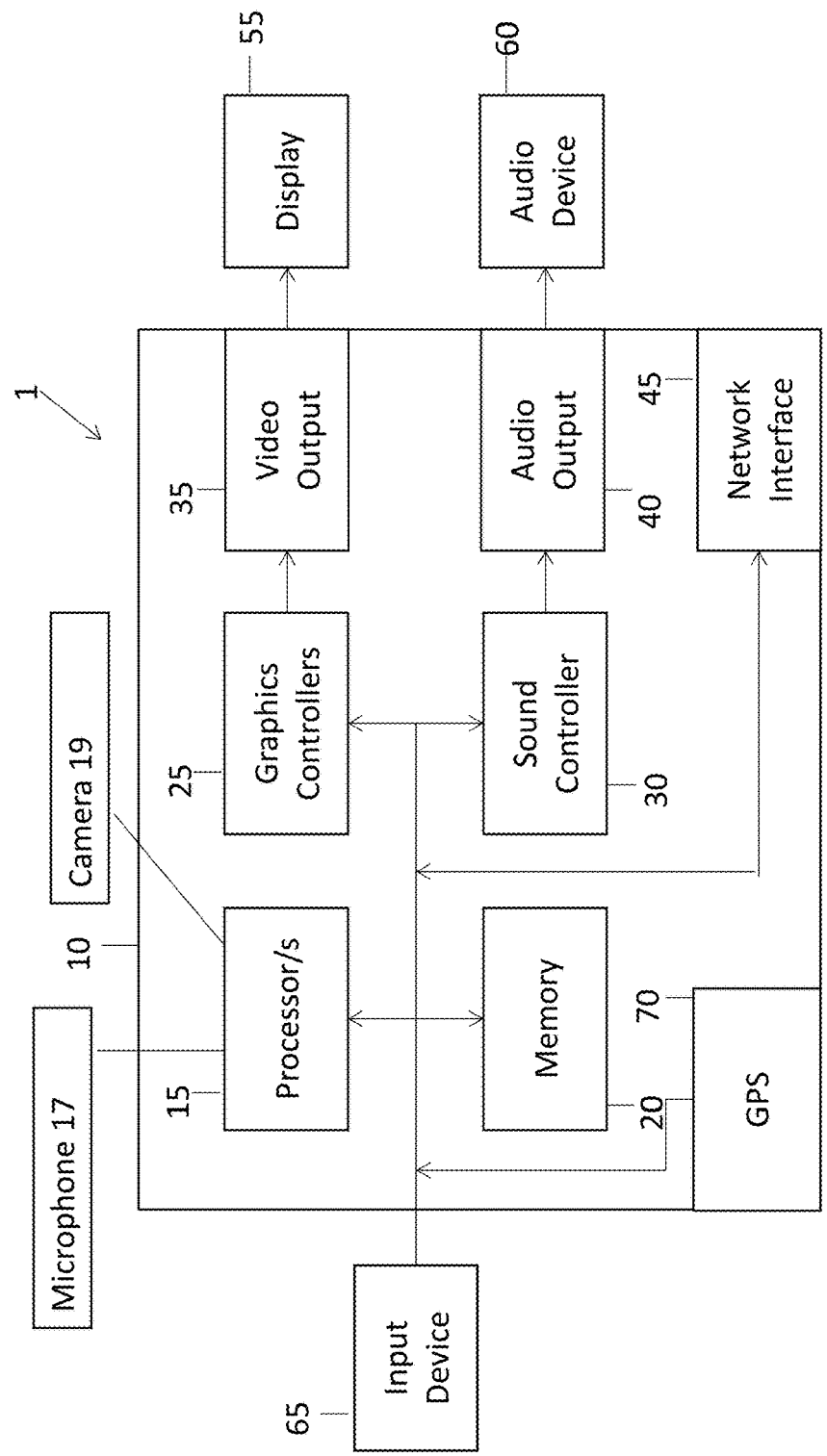
FIG. 2 shows an example user device in which some embodiments may be provided.

A schematic view of a user device 1 according to an embodiment is shown in FIG. 2. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments The control part 10 has an interface 45 allowing the device to be able to communicate with a network such as the Internet or other communication infrastructure. The control part 10 may have a GPS module 70 or similar configured to provide location information to the at least one processor 15 or memory 20. This is optional is some embodiments.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 3:
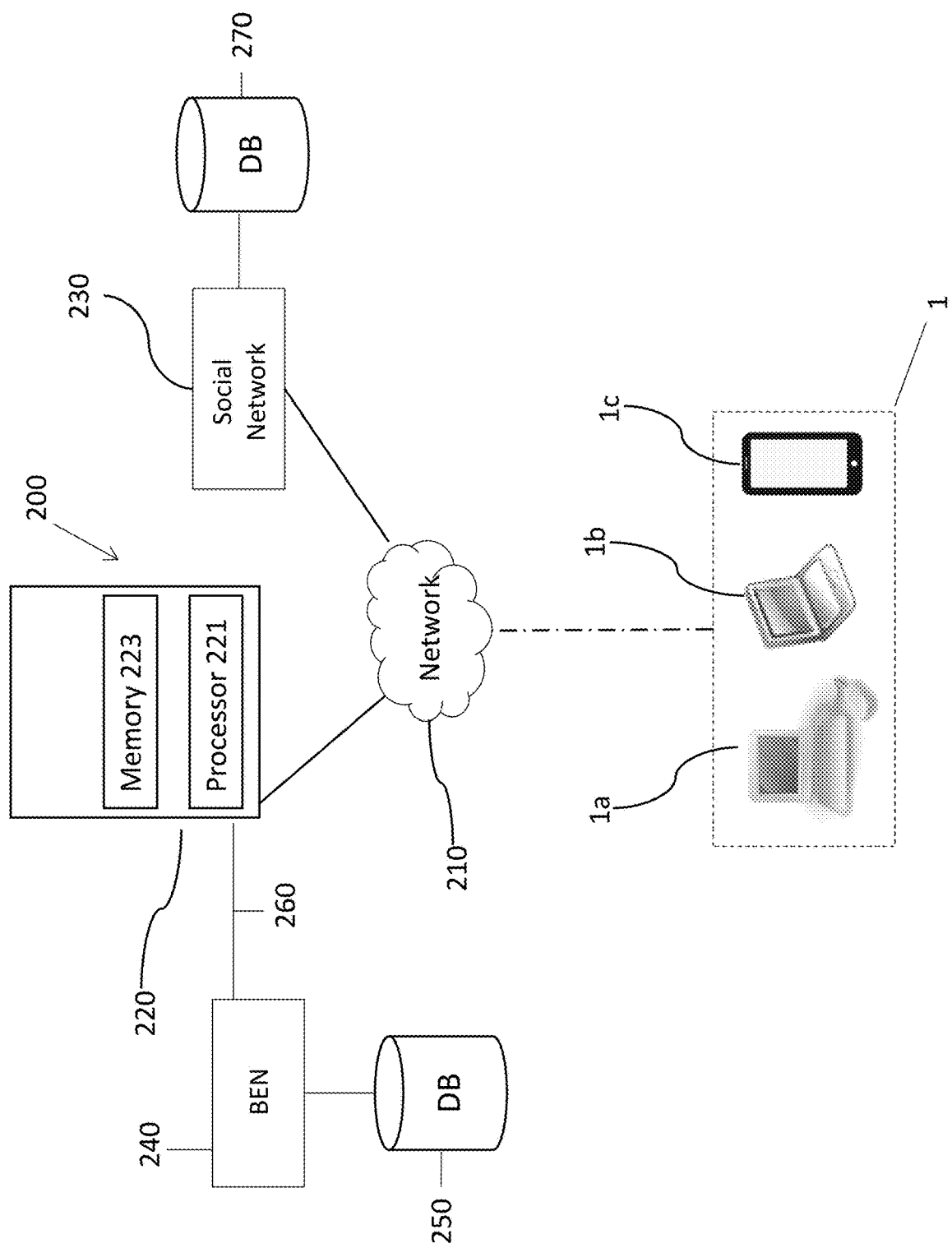
FIG. 3 shows an example system in which some embodiments may be provided.

FIG. 3 schematically shows a system 200 according to an embodiment. The system 200 comprises a server 220 which may store or be in communication with database 250 which may, in some embodiments, be connected to a back end infrastructure (BEN) of game player's details, profiles, statistics etc. In practice, one or more databases 250 may be provided. In practice, one or more servers 220 may be provided. Where one or more server is provided, the database(s) 250 may be provided in one database 250 across two or more servers. The server(s) 220 may also have a games data function. This may comprise one or more units of memory 223 to store the computer game program, user behaviour data and a control part to run the games program and process the user behaviour data. The control part may comprise one or more processors 221.

The server 220 may communicate via, for instance, the internet 210 to one or more client or user devices 1, shown in FIG. 3 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices 305. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

Figure 4:
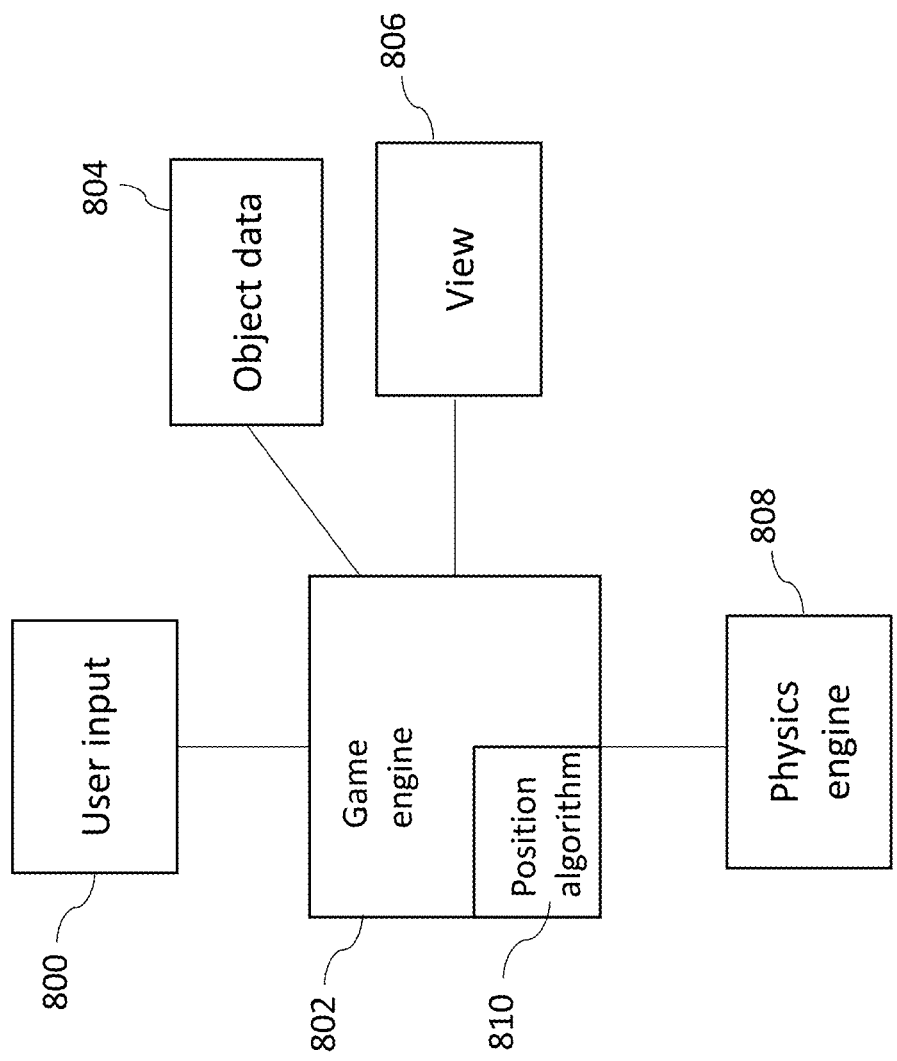
FIG. 4 schematically shows the functional blocks of an embodiment

Reference is made to FIG. 4 which schematically shows the functional blocks of an embodiment, which may enable such game play. A user input block 800 is shown. This captures the user input and feeds the input to a game engine 802. This user input can be via any suitable user interface, such as discussed earlier.

The game engine 802 will process the information provided by the user input. The game engine 802 (for example a game model) will determine if a valid combination has been made.

Each object (e.g. letter tile) has object data associated therewith. The object data 804 may be stored in any suitable memory location. In some embodiments, the object data may be considered to be part of the game engine and in other embodiments may be considered to be outside the game engine. The object data may provide information as to the properties of an object. These properties can include attribute information such as color and/or whether or not an object has a particular function such as a so-called booster function. The object data may include the position data, which is information representing the position of the object in the displayed image.

In some embodiments, the game engine will check if the game object satisfies the rule or rules for a valid match. The rule or rules which define whether or not a valid match has been made will be dependent on the game. In some embodiments, objects which have been selected will make a match if together they spell a valid word. In some embodiments, the game objects which match are removed.

Thus, the game engine will be in control of the matching mechanism. The game engine will have access to data for each tile including its position and which letter of the alphabet that tile represents, and will be able to determine if a match is made with a valid word. If a match is made, the tiles in the match are removed.

A physics engine 808 is provided which is configured to control the movement of the falling objects. This will be an object which has been caused to move or be removed as a result of a previous match. The physics engine will generally manage the movement of an object based on for example gravity which controls the falling of the object, collision detection, when the falling object hits another object and optionally rotation calculations when the falling object rolls, for example, down the side of the other objects.

The movement of the object is thus controlled by the physics engine, which will control the movement of an object as it falls, rolls down other objects etc.

The physics engine 808 may be part of the game engine 802.

A position control block 810 is provided. In the embodiment shown, this position control block may be part of the game engine. In other embodiments, this position control block may be outside the game engine. The position control block may be provided by a position algorithm in some embodiments.

A view function 806 uses of the object data to provide the displayed image with which the user is able to view and/or interact.

Figure 5:
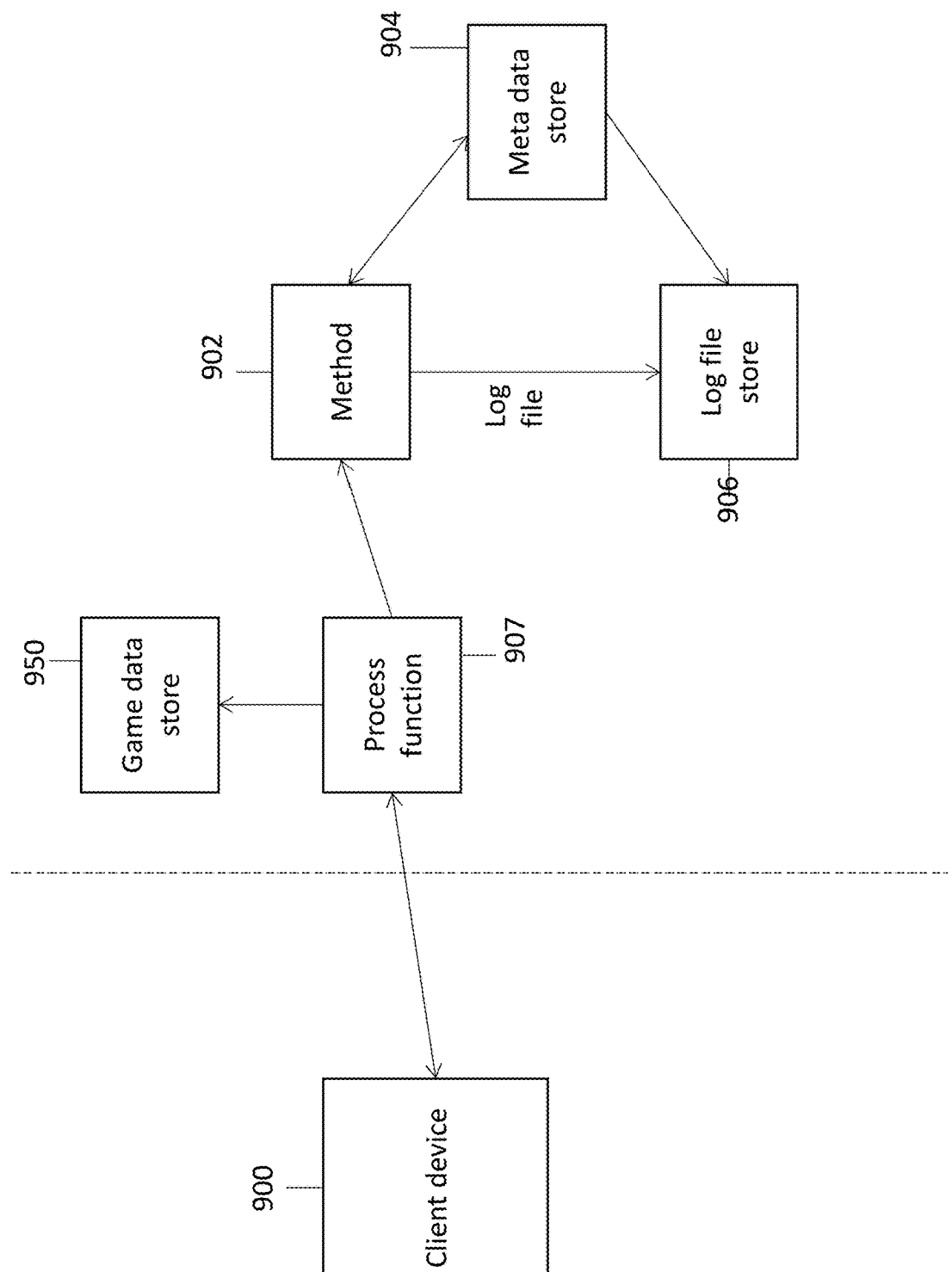
FIG. 5 schematically shows some of the functions provided by a server, according to some embodiments.

FIG. 5 is schematic and shows some of the functions provided on the server side. The physical entities which provide these functions may be any one or more suitable entities. The client device 900 (which may be as discussed in relation to FIG. 2) will allow the user to play the game. The client device will determine when a particular game event occurs and cause the client device to make a call to the method 902 which is on the server side. A process function 907 which may be provided by a server or the like will receive the call. The call is then directed to the method 902 by the process function. The method 902 may be on the same server as the process function or a different server to the process function. The server side also has the game data store 950 which stores a user's data, such as progress data or the like. Data for the game data store 950 may be received by the process function and directed to the game data store. In response to the invoking of the method 902, a log file is generated and is stored in a log file store 906. Any suitable data store 906 may be used to store the log file data 906, which may be the form of text files, as discussed above.

Meta data may provide a key to the data stored in the log files in the log file store. This will define for each of the game event identifiers, the format of the information stored in the log file. A separate store 904 can be provided for this metadata. This metadata store 904 can be used to determine how to parse the stored log files and allows new queries to be formulated easily. Analytics for the data can be determined by using the information in the metadata store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

The same method associated with the end of game event is used by one or more games. This means that all the log files associated with that same end of game method will have the same identifier so that analytics can be performed across more than one game. Like for like comparisons can be made for the same event across different games.

It should be appreciated that there may be a plurality of instances of the method which can be called. The methods will however be the same for the same associated game event, regardless of the game.

When writing a new game, a decision can be made as to what game events are to cause the generation of a log file. For each of those game events, a method stored on the server side will be invoked or called. The method which is stored on the server side may be the same regardless of the game. The game developer will therefore not need to write new code for the reporting associated with a particular game event. The game developer may make sure that the code generates the information, for example parameter values, for the method and that the particular game event will cause the client device to call the server. The game developer may need to ensure that the semantics used in the game match the semantics used in the game event method.

It should be appreciated that embodiments may be used with any suitable game event. The game event may be the completion of a level, the start of a game, the ending of a game, purchasing of a particular item, interaction with one or more friend, a particular score or the like.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be implemented to synchronize game state information and/or retrieve and connect to social graph information and user profile data on a social network such as Facebook or Google+.

Some embodiments may be implemented to enable connection to a plurality of social networks. The user may be given the option to select which information may be derived and/or shared with which social network.

Some embodiments may be provided in the context of so-called saga games. These are games which have one or more levels. In some games, a user may be required to complete a certain level before the user is able to progress to a next level. In some embodiments, the user may be able to go back and play any previous level.

A game may have a number of different levels. Different levels may have different requirements to be met. For example, some levels may have one or more specific goals. These goals could be to reach a certain amount of points before running out of moves or time; to bring down certain game elements to the bottom of the screen; to remove a certain amount of game elements before running out of moves or to collect certain game elements through specific matches before running out of moves. These are by of example only, and any other additional or alternative goals may be provided.

If the game becomes difficult there are boosters to help the player pass a level. These can be obtained from in-game purchases or received as gifts from Facebook friends.

Figure 7:
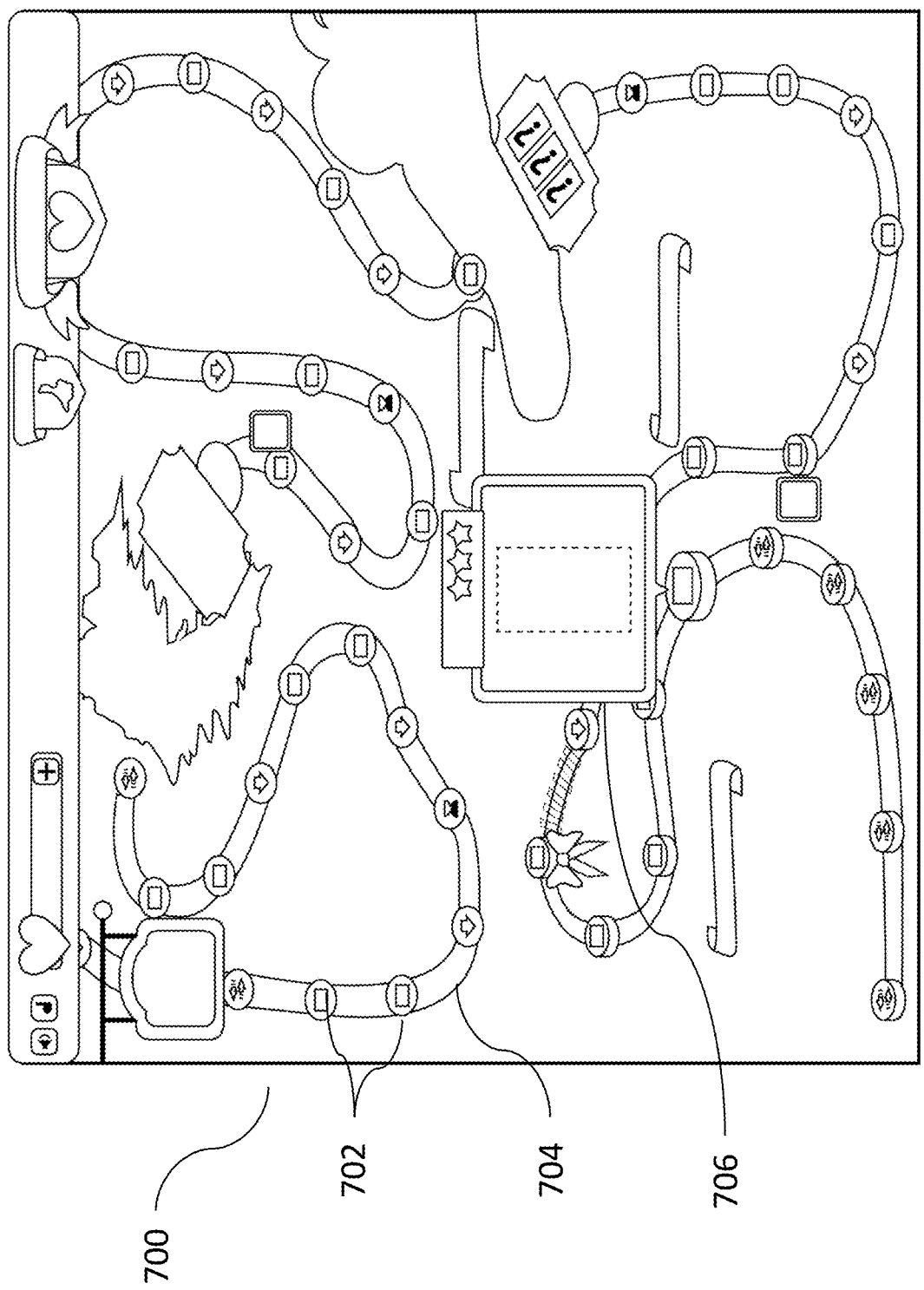
FIG. 7 schematically shows a representation of different levels of a game.

In some embodiments, the different levels may be represented on a map 700 FIG. 7 schematically shows one example of such a view. Different levels 702 are represented on a path 704 so that the user can see the progress which he has made playing the game. This also allows a user to go back and replay levels which he has previously played. The map view may show what levels have been completed as well as how many levels are left to play. Throughout the game and for each level completed, the player journeys across the map. In some embodiments, the levels are divided up into groups or chapters. In some embodiments, there may be a theme associated with each chapter. In some embodiments, as will be described later, there may be some features which can only be unlocked or provided if a user attains a certain achieved measured across a chapter.

In some embodiments, if the player has connected to a social network, then friends' progress from the same network may be viewed on the map by the means of information provided next to the highest level they have currently reached or by virtual of a league table which can be displayed.

In the map view, the player can hover over a level to display a thumbnail 706 of it. This makes it easier to find specific already completed levels, and can also give the player an idea of what to expect before actually starting a level. In some embodiments, thumbnails can be displayed for any level. In some embodiments, no thumbnails can be displayed for levels that have not yet been reached. In some embodiments, the thumbnail option is not provided.

Information may be provided on the map to display how well the player has done on the level if he has played it previously. This can for instance be represented with the number of stars the player has received on that level, the actual score or some other indication. This may be done via the thumbnail option, by displaying information on the map or by any other suitable mechanism.

When navigating on a map in a game, it may sometimes be difficult to find desired level or area of the map if the map is, for example, too large relative to the available display. In some embodiments, a smaller version 720 of the map is displayed. The user is able to select a part of that map to be displayed on the display such that the part of the map displayed is larger than when the entire map is displayed. The smaller version of the map will highlight the part of the map which is being displayed in enlarged from.

Figure 8:
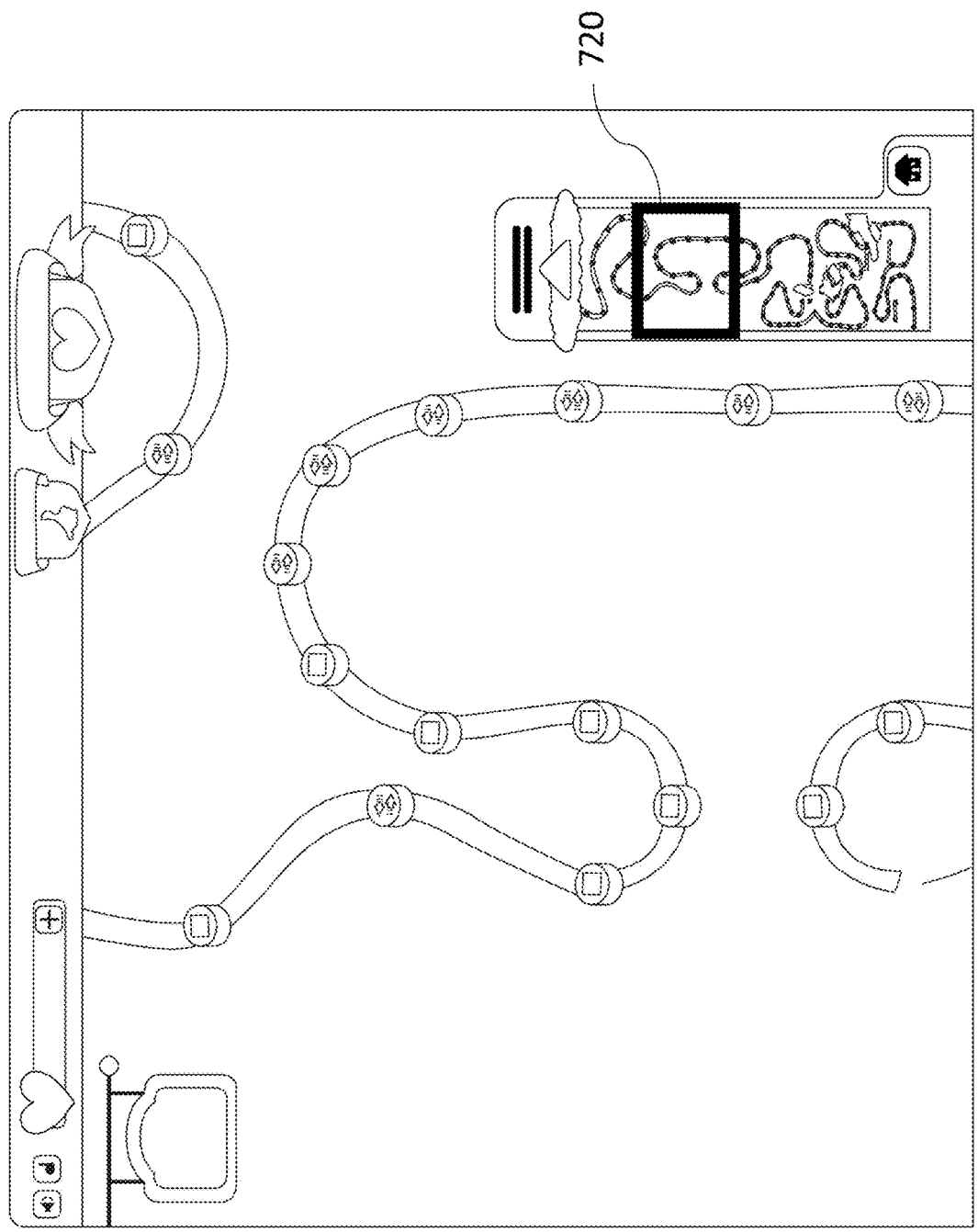
FIG. 8 schematically shows a zoomed representation of some of the different levels of the game.

In some embodiments, the smaller version of the map is only in full view when the player needs it; the rest of the time the smaller version of the map may be hidden with only a small part of it showing. Clicking on this small part will expand the smaller version of the map such as shown in FIG. 8 and referenced 720 and let the player use it. Clicking on the same part again will once more hide the smaller version of the map. When the smaller version of the map is expanded, the player is provided with a mini map showing an area of the map. The player can select anywhere on the mini map and when doing so the main view will jump to the same location, but zoomed in. The player may also scroll through the mini map which will then simultaneously scroll the map in the main view.

In some embodiments, the game can be implemented so that a player progresses through multiple levels of changing and typically increasing difficulty. As the player travels through the levels in the game, his progress may be represented as a journey along a path in the virtual map.

In some embodiment, the player moves between levels and completes the levels one by one along a path by playing the associated game. When the player reaches the goal of a level, the next level is unlocked and the player can play that level in the game.

The number of stages and levels can vary depending on the implementation. The levels may be numbered consecutively throughout the game or they can be numbered within a stage, it is also understood that other ways of identifying the levels can be provided.

One way of unlocking new stages is to complete the last level on the latest stage. The user may in some embodiments be provided with challenges to unlock the next stage in the virtual map.

In some embodiments, the user can play any of the unlocked levels on the map, so the user can go back and replay already completed levels to get a better score or beat friends' high scores.

The player is in some implementations of the game rewarded for good gameplay of a level, for instance reaching a target score. In some implementations the user has to reach a certain number of points to complete a level, reaching this target score can be represented with a symbol such as a star. In one embodiment a star is provided when the user reaches a certain number of points in a level. The user can earn more than one star on each level and the levels are re-playable to get a higher score.

In some embodiments, one or more unlockable game elements may be provided. Once such a game element has been unlocked, it may be may be deployed in any suitable level.

An unlockable game element may have one level of power. In other embodiments, an unlockable game element may have two or more different levels of power. A higher power means that the unlockable game element will have a greater effect on a game than when that unlockable game element has a lower power.

In some embodiments, the power of an unlockable game element will be dependent on how many stars or points or other measure of score that the user accumulates during game play, in a specific range of levels. In some embodiments the specific range of levels may correspond to one or more chapter. However, in some embodiments, the specific range of may not correspond to a specific chapter.

In some embodiments, an unlockable game element may have specific ability, which is what the unlockable game element will do when applied in a level.

In some embodiments, an unlockable game element may be bound to a specific game mode. This means that the unlockable game element can only be successfully applied to those levels having that specific game mode. In some embodiments, the user will only be able to select the unlockable game element if the level being played has the specific game mode. In some embodiments, the unlockable game element can be selected in any level, but will not provide any effect in those game levels not having the specific game mode.

In some embodiments, an unlockable game element may be bound to two or more specific game modes.

In some embodiments, there may be one or more unlockable game elements not bound to a specific game mode. Such a game element may be used in any level. In some embodiments, this generic unlockable game element may be the first game element to be unlocked so that the user will generally have at least one unlockable game element which he can use. In some embodiments, this generic game element may be provided unlocked. In this example, the generic unlockable game element may be provided at its lower or lowest power level.

Reference is made to FIG. 9 which shows a data structure associated with the generic unlockable game element. The first field 730 has the identity of the unlockable game element. In some embodiments, each of the unlockable game elements may be associated with an integer.

In the next field, a name key is provided. This may be in the form of a character and/or numeric string. This may be used for name translation.

In the next field 734, the power level is provided. In some embodiments, this may be provided as an integer. For example, where there are two power level modes, these can be represented by the values 1 and 2 or 0 and 1.

The next field 736 includes the ability of the unlockable game. In other words, this will provide the function which is carried out by the unlockable game element when applied to a particular level.

Field 738 defines the beginning of the levels at which the summing of stars associated with the user progression begins and field 740 defines the end level, that is the level at which the counting of stars is stopped. In other words, the start level and the end level define the specific range of levels in which the required number of stars is needed to be achieved in order to unlock the unlockable game element.

Field 742 will indicate the required number of stars. It should be appreciated that this will indicate how many stars are required for each power level of the unlockable game element.

The final field 744 has the game mode(s) in which the unlockable game element can be provided. If this field is empty, then the unlockable game element is the generic unlockable game element and can be applied to any level. In other embodiments, the generic unlockable game element may have the information which indicates that the game element is applicable to all game modes.

It should be noted that the order of the fields in the game structure is by way of example only and in other embodiments, the fields may be any other different order. It should be appreciated that in some embodiments, one or more additional fields may be provided.

The unlockable game element structure may be as follows:
  id: integer
  nameKey: String
  powerLevel: integer
  abilities: Vector.<Ability>
  startLevel: integer
  endLevel: integer
  requiredStars: Vector.<integer>
  gameModes: Vector.<String>-

Each unlockable game element has an ability or function when applied in a game. Power can be regarded as being a multiplier for that ability. The level of the unlockable game element decides the power level of the ability that gets applied when the ability is activated. For example, the ability may be to provide extra moves. At the lower power, fewer moves are provided as compared to at the higher power.

In some embodiments, the ability can be turned off by setting the power to 0.

For example, one unlockable game element, has the ability when applied to give extra points at the end of the level, but it will only give 5% points when at level 2. Otherwise it will give none (i.e. 0% power) and may not be shown.

Figure 6:
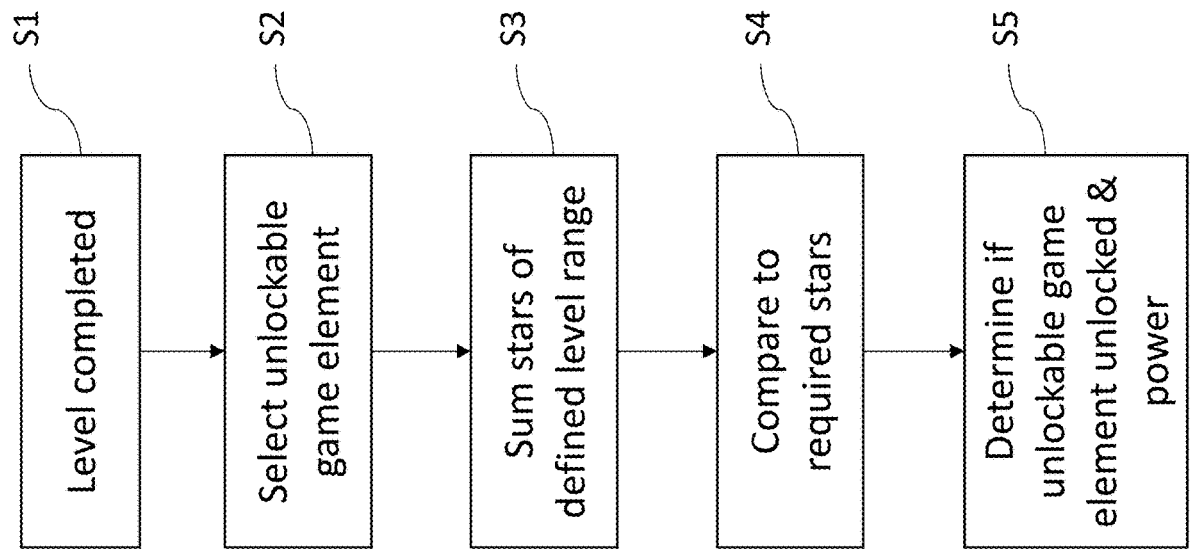
FIG. 6 is a flowchart according to an embodiment.

Reference is made to FIG. 6 which shows a flow of an embodiment which is performed by the client device. This flow may be used for determining whether or not an unlockable game element is to be unlocked and/or upgraded. This method may be carried out when a level has been completed, as determined in step S1. Alternatively or additionally, this method may be performed when the game star and progression information is received (synced) from the server.

In step S2, one of the unlockable game elements is selected. For example, the method flow can be repeated for each of the unlockable game elements in the order associated with the ID.

In step S3, the stars associated with the defined level range are summed. These are the stars associated with the user progression in the range defined by the start level and end level. It should be appreciated that if it is determined that the power level is zero, this means that an unlockable game element is locked. The unlockable game element, when locked, may be displayed in a suitable manner for example as a silhouette.

In step S4, the summed stars is compared to the required stars. It should be appreciated that for a given unlockable game element, there may be n required stars, where n is the number of power levels associated the unlockable claim element.

In step S5, it is determined if the unlockable game element is locked or unlocked and if so at what power.

It should be repeated to be appreciated that steps S2 to S5 are repeated for each of the unlockable game elements.

If it is determined that an unlockable game element has been unlocked and/or upgraded, information about this may be displayed to the user.

In some embodiment an unlockable element will be automatically unlocked and/or upgraded when the requirements for the unlocking and/or upgrading have been achieved. A particular requirement may be for a number of levels and/or points and/or stars and/or the like.

Figure 10:
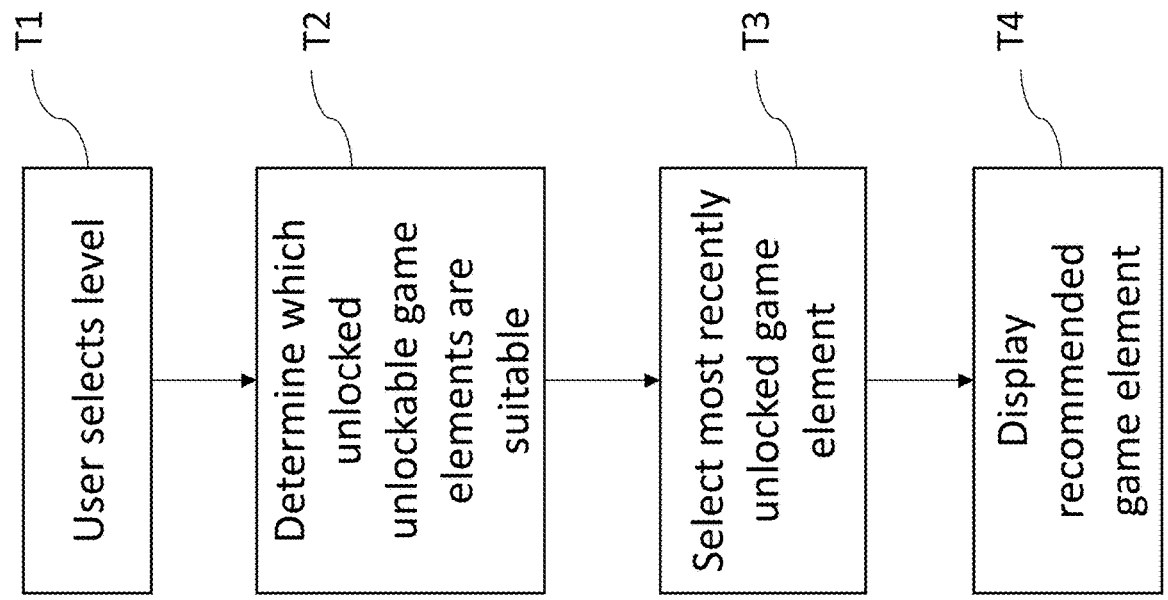
FIG. 10 is a flowchart according to an embodiment.

Reference is made to FIG. 10 which shows a method performed by the client device.

In some embodiments, when a pre-level popup is opened or a level is selected, an unlocked game element is recommended from all available unlocked game elements. This may be in accordance with the method of FIG. 10.

If there are no unlocked game elements (e.g. no unlocked game element with a power level>0) then a coming soon game element may be displayed. Otherwise an unlocked game element is pre-selected by the processor. In some embodiments, the first or one of the first game elements to be unlocked is generally the one which is suitable for all levels.

In particular, in step T1, input from the user is received from the user interface. In particular, via the user interface, the user selects a level to play.

In step T2, a determination is made as to which unlocked unlockable game elements are suitable for the selected level. When trying to recommend an unlocked game element, the processor is configured to go through all unlocked game elements and first determine if the unlocked game element is suitable for that level. This requires determining game mode information for the level or any specific game entity for which a game entity may be used.

An unlocked game element is suitable for a given level:

if the level game mode is specified in the game mode vector for unlocked game element binding or if the game modes vector is empty (indicating suitable for any game mode); and/or in case the ability affects a specific level entity (for example a particular blocker) if that blocker can be found in that level.

All unlocked game elements may be marked if they are suitable or not and may be displayed in such a way that those which can be used are visually distinct from those which are not. In some embodiments, the game elements which are not unlocked may also be displayed and again be visually distinct from the unlocked blockers. In some embodiments, a gallery may be available for a user to view with this information. The user may be able to select a different one of the game elements to that which is selected by the processor.

One or more game elements may be suitable for all game modes. One or more game elements may only be suitable for one or more, but not all, game modes. Different levels may have one or more different game modes.

In step T3, the most recently unlocked game element is selected from those unlocked game elements identified in step T2. The recommended unlocked game element may be the unlocked game element with the highest ID that is picked from the suitable unlocked game elements.

The recommended unlocked game element may be the most recently unlocked game element. In some embodiments, the recommended unlocked game element may be the most recently upgraded game element.

In step T4, the processor is configured to control the display to display the recommended game element which has been selected in step T3. The recommended unlocked game element may be automatically selected in a pre-level popup.

In some embodiments, alternatively or additionally, a user may be able to select which of the unlockable game elements to use, assuming the game element is usable. In some embodiments, those game elements which are locked and/or unusable may be displayed in a different way to those which are usable, in a gallery of such game elements.

In some embodiments, there may be one or more unlockable game elements which may be unlocked in a chapter. In some embodiments there may be two unlockable game elements in a chapter.

In some embodiments, an unlockable game element may only be unlocked in a particular chapter. In some embodiments the unlockable game element may only be upgraded to a particular level in a particular chapter. The chapter in which the unlockable game element is unlocked is the same or different to the chapter in which the unlockable game element is upgradable. In some embodiments, any upgrading of an unlockable game element can only take place in a single chapter.

Where a user selects the game element, this will be the default selection for when the user plays that level again.

The number of levels in a chapter or section may be any suitable number. For example, there may be between 40 and 50 levels.

The unlocking of unlockable game elements will be controlled by the number of stars collected by playing levels in the respective chapters.

In one example, there are 45 levels and up to three stars available in a level. In this example, there are two unlockable game elements each with two power levels. The first unlockable game element may be unlocked at 30 stars with a first power, the second unlockable game element may be unlocked at 40 stars with a first power, and the first and second game element may be upgraded to the second power at 130 stars. This is by way of example only and any other scheme may be used to control when the game element is unlocked and when it is upgraded.

In some embodiments, a game element may effect a game mode and/or a blocker or the like. In some embodiments, a chapter may have one game element which is able to affect a game mode and another that affects a blocker. The function provided by a game element may be dependent on the power.

In some embodiments, the first unlocked game element may affect any game mode. In some embodiments, the generic game element may be weaker than the specialised game elements.

Embodiments of the present application may allow the same unlockable game element to be used in different levels. In some embodiments, once an unlockable game element has been unlocked, that game element can be used in any other suitable level. That level may be a level which has previously been completed by the user and for example in an earlier chapter.

In some embodiments, this may vary the unlocked game elements which are provided to a user when for example they replay a level.

In some embodiments, once an unlockable game element has been unlocked, it will be available in any suitable game level with the matching game mode. This may mean that in some embodiments, a plurality of different locked game elements may be available to the user.

In some embodiments, the unlockable game elements may be provided in the form of characters which can help a user to achieve a particular goal in a game. The characters may be animated creatures or the like The functions provided by an unlockable game element may be any suitable function by way of example they may be one or more of the following: providing a percentage of score as an extra score, provide extra moves, provide in game currency, remove or assist in the removal a particular type of blocker or any other suitable function. A blocker may be a particular feature of a level which may require removal or may be a feature which impedes the user from achieving a goal.

Embodiments may be able to reuse unlockable game elements. Once an unlockable game element has been unlocked, it can be used in in the level for which that now unlocked game element is suitable. For example, the unlocked game element may be used in the same chapter or set in which the game element has been unlocked. Alternatively, this can be used in later and/or earlier chapters. This means that the some unlockable game elements can be reused in different ways throughout the game. A user may find different game elements recommended to him, even when he replays the same level.

As some embodiments provide a recommendation mechanism, the user can have his new unlocked game elements presented to him at appropriate levels, to maintain interest.

In some embodiments, the algorithm may be configured to make sure that the user is presented with a variety of recommended unlocked game elements to prevent the user from being presented with the same unlocked game elements too many times. In some embodiments, information may be stored as to the last z recommended game elements, where z is an integer. This may be used to ensure that there is some variety in the recommended unlocked game elements. This may particularly be the case where the user has a relatively large number of unlocked game elements.

The unlocked unlockable game element is one which can be unlocked and then used in an appropriate level to achieve a game function which will generally allow the user to achieve a desired goal. When selected by the user, this game element will provide a function, some examples of which have been previously given.

In some embodiments, the client device may be configured to send information back to the server. The information sent back to the server may comprise any suitable information. For example, information about the game elements which have been unlocked and their power level may be sent back to the server. In some embodiments, information about the level on which the game element has been unlocked may be sent back to the server.

When a user of device goes off-line, the user is able to continue to play the game. However, synchronizing information needs to be sent back to the server such as information on the different levels, scores associated with the levels; and/or information on any unlocked game elements.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A method for providing a computer implemented game in a user device, the user device comprising at least one processor, a user interface and a display, the user device being configured to provide the method comprising:
   receiving, by the at least one processor, from the user interface an input from a user selecting a level of a plurality of levels of the computer implemented game to play, the selected game level having an associated goal associated with at least one of a game feature and a game mode;
   in response to selection of the level, selecting by the at least one processor, a plurality of different unlocked game elements in the form of characters to be displayed on the display, the plurality of unlocked game elements being from a plurality of unlockable game elements which have been unlocked;
   receiving by the at least one processor user input from the user interface to select one of the plurality of unlocked game elements displayed on the display; and
   displaying on the display a game board for the game level which has been selected, the game board comprising a plurality of game elements,
   wherein the method comprises causing the selected one of the plurality of unlocked game elements to provide a function in the selected game level, the function being dependent on the selected unlocked game element and being one which is able to assist the user when playing the selected game level to reach the associated goal.

2. The method as claimed in claim 1, wherein each time a level of the computer implemented game is selected, the method comprises selecting by the processor at least one unlocked game element of the plurality of unlocked game elements such that over a plurality of level selections, different ones of the plurality of unlocked game elements are selected to be displayed on the display.

3. The method as claimed in claim 1, comprising determining by the at least one processor that an unlockable game element is to be unlocked responsive to previous play of the computer implemented game.

4. The method as claimed in claim 1, comprising determining by the at least one processor that one or more requirements associated with unlocking of an unlockable game element have been satisfied and unlocking the respective unlockable game element.

5. The method as claimed in claim 1, comprising selecting, by the processor, the unlocked game element from a plurality of unlocked game elements, the selection being dependent on a criteria associated with the unlocked game elements.

6. The method as claimed in claim 5, wherein the criteria comprises at least one of: which game element has been most recently unlocked; which game element has been most recently upgraded; which game element has the greatest effect on the selected game level; or which game element is recommended for the selected game level.

7. The method as claimed in claim 1, comprising displaying, by the display, at least some of the unlockable game elements wherein the unlockable game elements which are at least one of unlocked and usable in the level are displayed in a visually distinct manner on the display.

8. The method as claimed in claim 1, comprising storing the one of the plurality of unlocked game elements selected by the user input in memory, and in response to user input from the user interface causing the level to be replayed, providing the same user selected unlockable game element as the unlocked game element to provide a function in the selected game level.

9. The method as claimed in claim 1, comprising determining, by the at least one processor, for at least one unlockable game element current information for a range of levels associated with the unlockable game element; comparing, by the at least one processor, the current information to respective unlocking and/or upgrading information; and unlocking and/or upgrading, by the at least one processor, the game element if the current information exceeds the respective unlocking and/or upgrading information.

10. The method as claimed in claim 1, wherein the computer implemented game comprises a plurality of levels, the plurality of levels being divided into a plurality of sets, at least one unlockable element being associated with a respective set.

11. The method as claimed in claim 10, comprising at least one of unlocking and upgrading an unlockable game element, by the at least one processor, in response to game play of the user over a plurality of levels of the set associated with the unlockable game element.

12. The method as claimed in claim 1, comprising unlocking, by the at least one processor, an unlockable game element in one game level and using, by the at least one processor, the unlocked game element in another level.

13. The method as claimed in claim 12, comprising using, by the at least one processor, the unlocked game element in one or more levels at least one of which: a user has previously played prior to the unlocking of the respective unlockable game element; and is subsequent to the level in which the game element has been unlocked.

14. A computer device configured to provide a computer implemented game having:
- a user interface configured to detect user input;
- a display;
- at least one processor configured to:
    - receive the detected user input from the user interface selecting a level of a plurality of levels of the computer implemented game to play, the selected game level having an associated goal associated with at least one of a game feature and a game mode,
    - in response to selection of the level, select a plurality of different unlocked game elements in the form of characters to be displayed on the display, the plurality of unlocked game elements being from a plurality of unlockable game elements which have been unlocked;
    - receive user input from the user interface to select one of the plurality of unlocked game elements displayed on the display; and
    - cause the display to display a game board for the game level which has been selected, the game board comprising a plurality of game elements,
    - wherein the selected one of the plurality of unlocked game elements provides a function in the selected game level, the function being dependent on the selected unlocked game element and being one which is able to assist the user when playing the selected game level to reach the associated goal.

15. The computer device of claim 14, wherein each time a level of the computer implemented game is selected, the at least one processor is configured to select at least one unlocked game element of the plurality of unlocked game elements such that over a plurality of level selections, different ones of the plurality of unlocked game elements are selected to be displayed on the display.

16. The computer device of claim 14, wherein the at least one processor is configured to determine that an unlockable game element is to be unlocked responsive to previous play of the computer implemented game.

17. The computer device of claim 14, wherein the at least one processor is configured to determine that one or more requirements associated with unlocking of an unlockable game element have been satisfied and unlocking the respective unlockable game element.

18. The computer device of claim 14, wherein the at least one processor is configured to select the unlocked game element from a plurality of unlocked game elements, the selection being dependent on a criteria associated with the unlocked game elements.

19. The computer device of claim 18, wherein the criteria comprises at least one of: which game element has been most recently unlocked; which game element has been most recently upgraded; which game element has the greatest effect on the selected game level; or which game element is recommended for the selected game level.

20. A computer program product for providing a computer implemented game on a computer device, the computer program product comprising code embodied on a non-transitory computer-readable medium and being configured so as when executed on a processor of the computer device to:
- receive from the user interface an input from a user selecting a level of a plurality of levels of the computer implemented game to play, the selected game level having an associated goal associated with at least one of a game feature and a game mode;
- in response to selection of the level, select a plurality of different unlocked game elements in the form of characters to be displayed on a display, the plurality of unlocked game elements being from a plurality of unlockable game elements which have been unlocked;
- receive user input from the user interface to select one of the plurality of unlocked game elements displayed on the display; and
- display on the display a game board for the game level which has been selected, the game board comprising a plurality of game elements,
- wherein the selected one of the plurality of unlocked game elements provide a function in the selected game level, the function being dependent ono the selected unlocked game element and being one which is able to assist the user when playing the selected game level to reach the associated goal.

* * * * *